US007509146B2

(12) United States Patent
Leabman (10) Patent No.: US 7,509,146 B2
(45) Date of Patent: Mar. 24, 2009

(54) BEAMFORMING USING SUBSET OF ANTENNA ARRAY

(75) Inventor: Michael Leabman, San Ramon, CA (US)

(73) Assignee: PureWave Networks, Inc., Mountain View, CA (US)

( * ) Notice: Subject to any disclaimer, the term of this patent is extended or adjusted under 35 U.S.C. 154(b) by 328 days.

(21) Appl. No.: 11/196,804

(22) Filed: Aug. 3, 2005

(65) Prior Publication Data

US 2007/0093269 A1 Apr. 26, 2007

(51) Int. Cl.
*H04M 1/00* (2006.01)

(52) U.S. Cl. ............ 455/562.1; 455/13.3; 455/19; 455/25; 455/63.4; 455/82; 343/876; 370/419; 370/328

(58) Field of Classification Search .......... 455/562.1, 455/13.3, 19, 25, 63.4, 82, 121, 129; 343/876; 370/419, 328
See application file for complete search history.

(56) References Cited

U.S. PATENT DOCUMENTS

| 5,748,683 | A | 5/1998 | Smith et al. |
| 5,995,062 | A | 11/1999 | Denney et al. |
| 6,452,536 | B1 | 9/2002 | Thomassen |
| 6,900,775 | B2 * | 5/2005 | Shapira ............ 343/844 |
| 2003/0052828 | A1 | 3/2003 | Scherzer et al. |
| 2003/0137952 | A1 * | 7/2003 | Menon ............ 370/328 |
| 2004/0196813 | A1 | 10/2004 | Ofek et al. |
| 2004/0196834 | A1 * | 10/2004 | Ofek et al. ........ 370/352 |
| 2006/0038738 | A1 * | 2/2006 | Shtrom ............ 343/876 |
| 2006/0126512 | A1 * | 6/2006 | Jain et al. ............ 370/236 |
| 2006/0209866 | A1 * | 9/2006 | Steenkiste et al. ...... 370/419 |

FOREIGN PATENT DOCUMENTS

WO  WO 2005/060574  7/2005

OTHER PUBLICATIONS (RADIOS4YOU) "Introduction to Shortwave" in: radios4you (On Line, <URL: http://web.archive.org/web/20030731224130/http://radios4you.com/shortwave-listening.html>) Jul. 31, 2003; entire document.

* cited by examiner

*Primary Examiner*—Sanh D Phu
(74) *Attorney, Agent, or Firm*—Steptoe & Johnson LLP (57) ABSTRACT

A radio communication system including multiple antenna elements divided into subgroups of at least two antenna elements, and multiple line cards operable to employ spatial processing techniques. Each line card is coupled to a subgroup such that the line card may transmit and receive signals using the subgroup. A base station for use in a radio communication system includes one or more line cards. Each line card includes an antenna interface used to couple the line card to a subgroup of multiple antenna elements, a radio frequency component coupled to the antenna interface, and a signal processing component coupled to the radio frequency component such that the line card is operable to transmit and receive radio frequency communications. A method for providing increased capacity in a radio communication system includes dividing an antenna array, creating N subgroups of antenna elements, and for each of the N subgroups of antenna elements, coupling a line card to the subgroup of antenna elements. Each line card is operable to communicate using its coupled subgroup of antenna elements.

15 Claims, 12 Drawing Sheets

|  | Antenna Group 1 | Antenna Group 2 | Antenna Group 3 | Antenna Group 4 |
|---|---|---|---|---|
| Spectrum A | Line Card 1101 | Line Card 1102 | Line Card 1103 | Line Card 1104 |
| Spectrum B | Line Card 1105 | Line Card 1106 | Line Card 1107 | Line Card 1108 |
| Spectrum C | Line Card 1109 | Line Card 1110 | Line Card 1111 | Line Card 1112 |
| Spectrum D | Line Card 1113 | Line Card 1114 | Line Card 1115 | Line Card 1116 |

BEAMFORMING USING SUBSET OF ANTENNA ARRAY

TECHNICAL FIELD

This disclosure is directed to a radio communication system and, more particularly, to the use of transmit and/or receive beamforming with a subset of the antennas of an antenna array.

BACKGROUND

A metropolitan area network is a class of network between a local area network and a wide-area network that typically covers an area from the size of a group of small buildings to the size of a large city. For example, a data network using cable television infrastructure may be deployed in one or more neighborhoods, forming a metropolitan area network providing high-speed Internet access.

In recent years, wireless networks based on the IEEE 802.11 standard have been widely deployed to provide high-speed data service across local area networks. Because these systems may be deployed using relatively low-powered radios, it has been possible to embed 802.11 radios in laptops, mobile phones, and other electronic devices. These wireless local area networks have provided convenient, high-speed Internet access in cafes, hotels, businesses, and homes. It is desirable to provide the same convenience available using 802.11 in a local area network across a wider, metropolitan area network.

The IEEE 802.16-2004 standard was promulgated to facilitate development of wireless metropolitan area network systems. While wireless metropolitan area networks may employ technology similar to that used in wireless local area networks, many new technical challenges arise in designing systems that operate effectively over a wider area. The performance of these wireless systems is limited by the link budget between base and remote stations. By increasing the link budget, the overall capacity, coverage, and bandwidth may be improved.

To improve performance of wireless metropolitan area networks, some have proposed employing spatial processing techniques with an antenna array (i.e., an antenna system having multiple antenna elements arranged in any fashion). One such spatial processing technique, beamforming, may be employed to vary the gain and phase characteristics of signals radiated or received by each of the antenna elements to form a radiation pattern designed to attenuate interference and to improve signal gain in one or more directions, thus increasing the link budget and improving system performance.

While beamforming and other spatial processing techniques may be effective, they do not come without cost. These techniques are computation intensive and require hardware support to couple multiple antennas. This additional hardware and computational capability may significantly increase the cost of a wireless system. Accordingly, it is desirable to provide a radio communication system capable of employing spatial processing techniques with reduced hardware support and computational complexity.

As discussed above, it is desirable to increase the capacity and performance of wireless metropolitan area network systems in a cost-effective manner. However, each deployment provides differing requirements. Some wireless metropolitan area networks may need to support large numbers of users in a small geographical area, while other networks may need to support a small number of users over a large geographical area. In addition, the bandwidth requirements of different customers may vary greatly. Instead of designing a system that meets the needs of the most demanding deployments at the expense of less demanding deployments, it is desirable to provide a scalable architecture that can be configured to meet the needs of most wireless network providers.

SUMMARY

In one general aspect, a radio communication system including multiple antenna elements divided into subgroups of at least two antenna elements, and multiple line cards operable to employ spatial processing techniques. Each line card is coupled to a subgroup such that the line card may transmit and receive signals using the subgroup. The subgroups may be non-overlapping or overlapping such that one or more antenna elements may belong to multiple subgroups.

In some implementations, the radio communication system includes a radio frequency combiner such that multiple line cards may be coupled to an antenna element using the radio frequency combiner. Using the radio frequency combiner, the radio communication system may combine signals such that multiple line cards may simultaneously transmit signals through the same antenna element.

Each line card may be implemented using multiple radio frequency components such that each radio frequency component is coupled to an antenna element of the subgroup, and a signal processing component coupled to the multiple radio frequency components, the signal processing component operable to employ spatial processing techniques.

In some implementations, the multiple antenna elements are disposed about multiple faces. Each subgroup may correspond to one of the multiple faces and may include one or more antenna elements from an additional face. For example, 16 antenna elements may be disposed about four faces with the antenna elements divided into four subgroups, one subgroup corresponding to each of the four faces.

In another general aspect, a base station for use in a radio communication system includes one or more line cards. Each line card includes an antenna interface used to couple the line card to a subgroup of multiple antenna elements, a radio frequency component coupled to the antenna interface, and a signal processing component coupled to the radio frequency component such that the line card is operable to transmit and receive radio frequency communications. An additional line card may be added to the base station to increase the capacity of the base station. In some implementations, additional line cards may be coupled to different subgroups of the antenna elements to increase capacity of the base station.

Base stations may further include a radio frequency combiner coupled to a subgroup of the multiple antenna elements such that the line card is coupled to the subgroup of the multiple antenna elements through the radio frequency combiner. Multiple line cards may be coupled to the same antenna elements using a radio frequency combiner to increase system capacity by supporting additional spectrum. For example, in some implementations, each line card supports 5 megahertz of spectrum.

In another general aspect, a method for providing increased capacity in a radio communication system includes dividing an antenna array, creating N subgroups of antenna elements, and for each of the N subgroups of antenna elements, coupling a line card to the subgroup of antenna elements. Each line card is operable communicate using its coupled subgroup of antenna elements.

In some implementations, the method further includes dividing available spectrum, creating M subgroups of the available spectrum such that each line card is operable to service a subgroup of the available spectrum. In these implementations, capacity of the radio communication system may be increased by configuring multiple line cards to service different subgroups of the available spectrum using the same subgroup of antenna elements. The antenna array may include at least one antenna element that is not within the N subgroups of antenna elements.

For example, a radio communication system may include 16 antennas divided into four subgroups of four antennas. If the 16 antennas are situated about four faces, then each of the four subgroups may correspond to a face. In some implementations, an antenna element is included in more than one of the subgroups.

The details of one or more implementations are set forth in the accompanying drawings and the description below. Other features and advantages will be apparent from the description and drawings, and from the claims.

DETAILED DESCRIPTION

Figure 1:
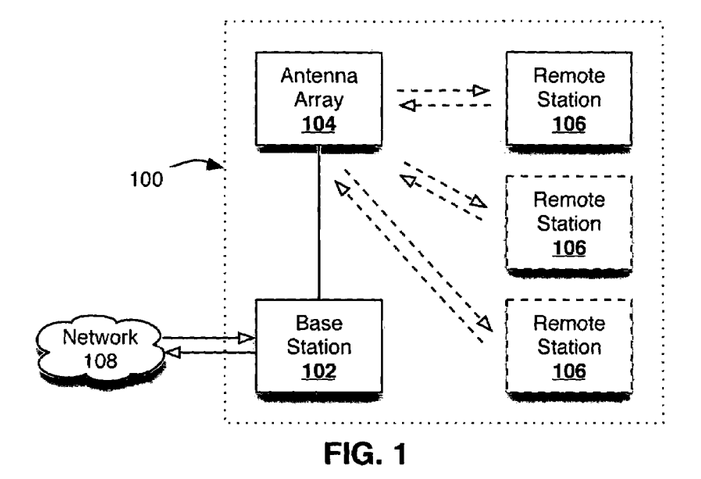
FIG. 1 is a block diagram of a radio communication system.

Referring to FIG. 1, a radio communication system 100 comprises a base station 102 coupled to an antenna array 104 and operable to communicate with one or more remote stations 106. The base station 102 is coupled to a network 108 such that the base station 102 can transfer information between the network 108 and the remote stations 106. The radio communication system 100 may be used to provide wireless services, such as, for example, wireless metropolitan area networks, wireless local area networks, wireless video-on-demand, and/or wireless voice services.

For example, the radio communication system 100 may be used to implement a wireless local area network (WLAN) based on the IEEE 802.11 standard. In this implementation, the base station 102 serves as an access point or as a router, connecting one or more remote stations 106 to a network 108, which can be a local area network (LAN) or a wide area network (WAN), such as the Internet. The remote stations 106 typically are laptop or desktop computers configured with wireless network interface cards.

The base station 102 is a hardware device that facilitates radio frequency (RF) communications with remote stations 106. The RF communications is typically two-way (with the base station 102 and remote station 106 transmitting and receiving information from one another); however, the techniques described herein may also be used with one-way RF communications, such as, for example, a video or information broadcast system, or a pager system.

To facilitate two-way RF communications, the base station 102 includes at least one antenna and a signal processing unit. The signal processing unit typically includes components to filter and amplify signals, to convert signals between analog and digital, and to interpret and process received data.

The base station 102 and remote stations 106 may be implemented using conventional electronic design and manufacturing techniques using application-specific integrated circuits and/or commercial off-the-shelf components. Portions of the implementations may be carried out in software-configured digital signal processors (DSPs) or general-purpose microprocessors.

Figure 2:
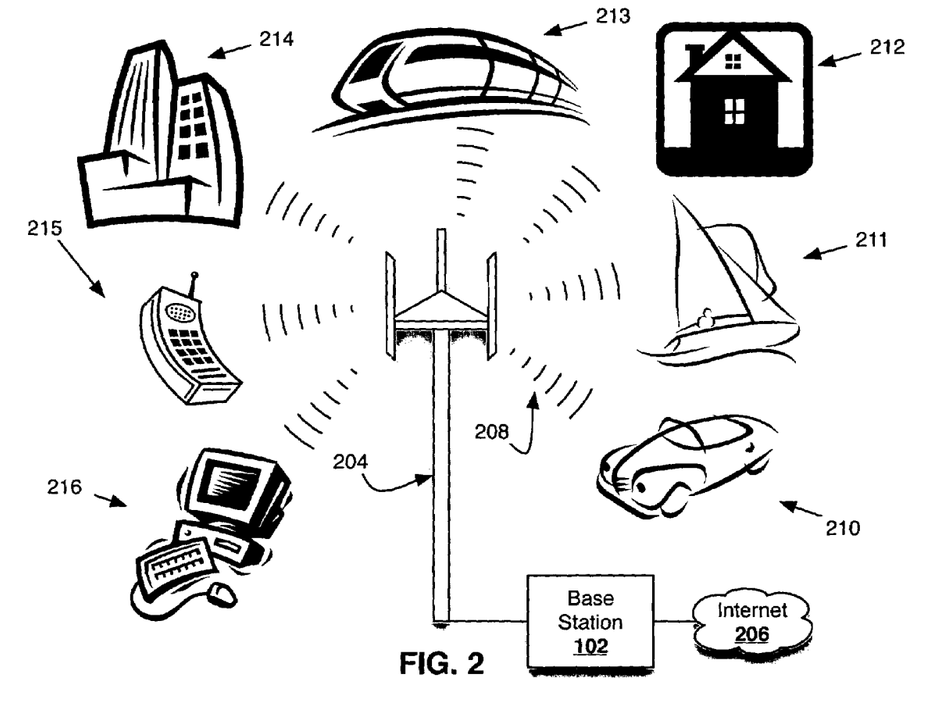
FIG. 2 is diagram of a metropolitan area network.

Referring to FIG. 2, in one implementation of the radio communication system 100 a base station 102 is coupled to an antenna array 204 situated off the ground so as to provide wireless communication services across a wide area. In addition, the base station 102 is coupled to a high-speed communications network 206 (e.g., the Internet) to provide a wireless link 208 between the network 206 and various remote stations 106. For example, the radio communication system 100 may be used to provide high-speed Internet access to users in cars 210, boats 211, homes 212, public transportation 213, and office buildings 214. Users may access the radio communication system 100 using a wide variety of electronic devices including mobile phones 212 and computers 216.

Figure 3A:
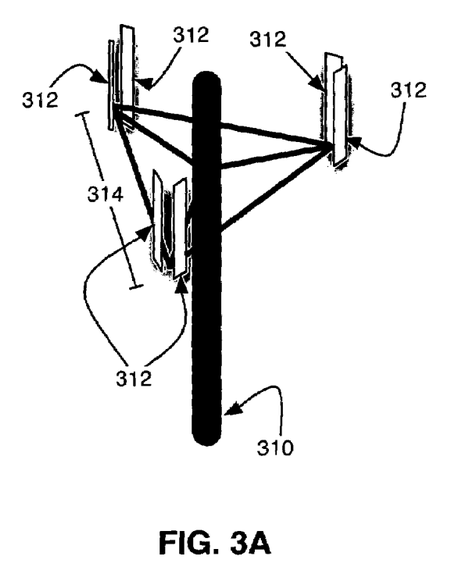
FIGS. 3A and 3B are antenna arrays that can be used in the radio communication system shown in FIG. 1.
Figure 3B:
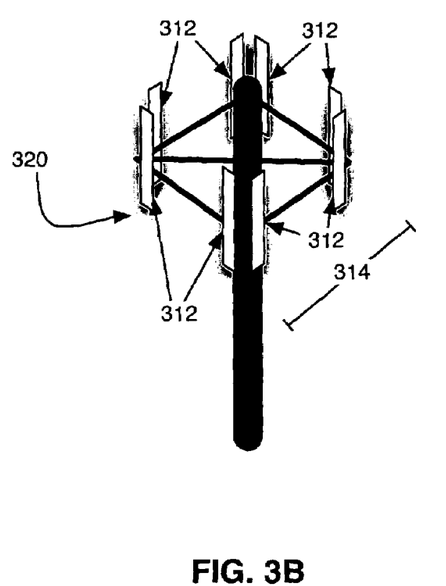

To perform spatial processing techniques, the radio communication system 100 is coupled to the antenna array 104. The antenna array may be implemented using two or more antenna elements arranged in any fashion. FIGS. 3A and 3B illustrate two exemplary antenna array 104 designs.

Referring to FIG. 3A, an antenna array 310 includes 12 antenna elements situated about three faces using six antenna panels 312. In this design, the antenna panels 312 on each face are situated far enough apart (distance 314) so that there is sufficient spatial diversity between antenna elements. In this example, the distance 314 is at least approximately 10 times the wavelength of signals transmitted and received by the antenna array 310. It is advantageous to mount the antenna panels 312 as high as possible to maximize coverage. In this example, the antenna panels 312 are mounted on a structure attached to a pole. Alternatively, the antenna panels 312 may be placed on buildings or affixed to other structures.

Each of the antenna panels 312 provides a connection to each of its antenna elements. In this example, twelve wires may be run (2 to each antenna panel 312) to a base station 102. The base station 102 is typically situated near the base of the antenna array's 310 supporting structure. For example, a base station 102 may be placed in a small building at the base of the antenna array 312 with 12 lines running up the pole or other support structure to the 12 antenna elements.

Referring to FIG. 3B, an antenna array 320 (similar to that described above with reference to FIG. 3A) includes 16 antenna elements situated about four faces using eight antenna panels 312. As in the previous antenna design, the antenna panels 312 on each face are situated a sufficient distance 314 from one another to provide sufficient spatial diversity. This antenna array 320 may be installed in the manner discussed above using 16 wires, one for each antenna element, between a base station 102 and the antenna array 320.

Figure 3C:
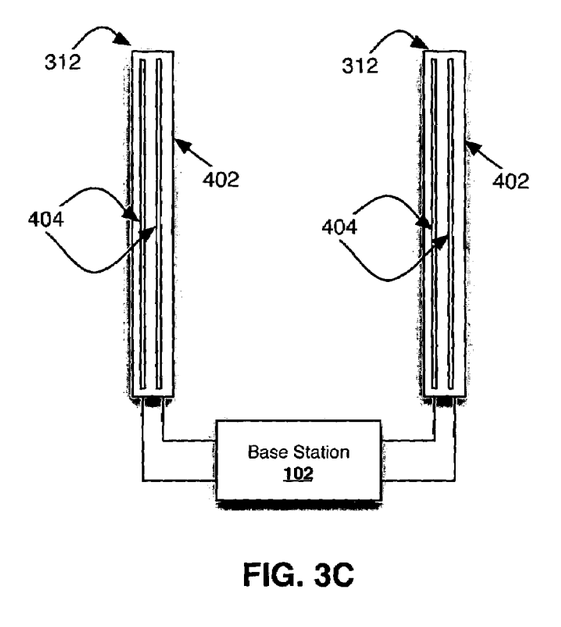
FIG. 3C is a diagram of one face of an antenna array such as those shown in FIGS. 3A and 3B.

Referring to FIG. 3C, each face of the antenna arrays 310 and 320 includes two antenna panels 312 with each panel 312 including a case 402 enclosing two antenna elements 404. Typically, the antenna elements 404 are sized based on the frequencies to be transmitted and/or received. For example, the antenna elements 404 may be sized to be approximately one wavelength. In this implementation, the case 402 is a plastic enclosure to protect the antenna elements 404 from the elements and to facilitate mounting. As such, the case 402 is optional-antenna elements 404 may be installed individually in an antenna array 104 without using antenna panels 312 or the antenna panels 312 may be formed using non-enclosing hardware.

In a conventional beamforming system, each antenna element of an antenna array 104 is coupled to a base station 102 and the base station 102 performs spatial processing for the array as a whole. When a large number of antenna elements are used, these spatial processing techniques require substantial computational resources.

The computational complexity of a radio communication system 100 employing spatial processing may be reduced by dividing the antenna elements of the antenna array 104 into subgroups. Then, spatial processing techniques may be applied using the antenna elements in each of the subgroups. This technique retains much of the benefit of spatial processing while reducing the overall computational complexity.

Figure 4A:
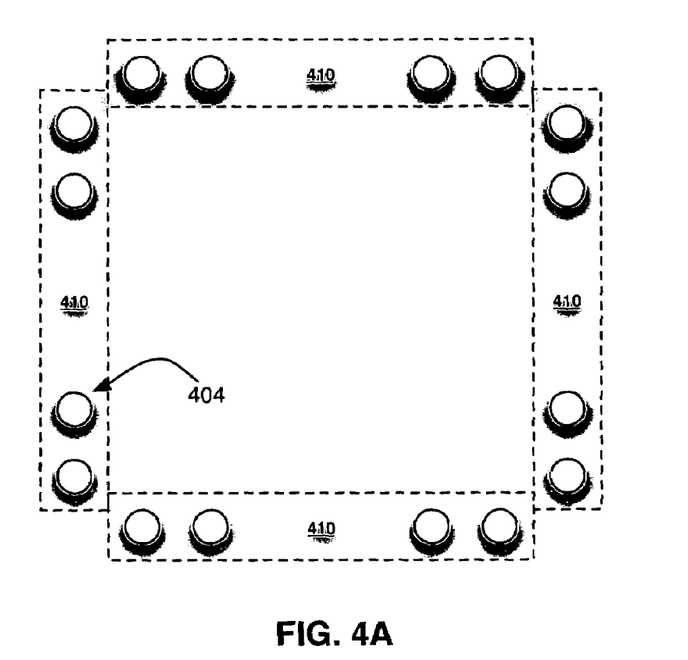
FIGS. 4A, 4B, and 4C are block diagrams showing various ways to configure antenna subgroubs in a 16-element antenna array.

Referring to FIG. 4A, an antenna array 104 containing 16 antenna elements 404 may be divided into four subgroups 410 with a group corresponding to each of four faces, as shown. This configuration provides the ability to steer beams and/or nulls to provide increased performance in many situations.

Figure 4B:
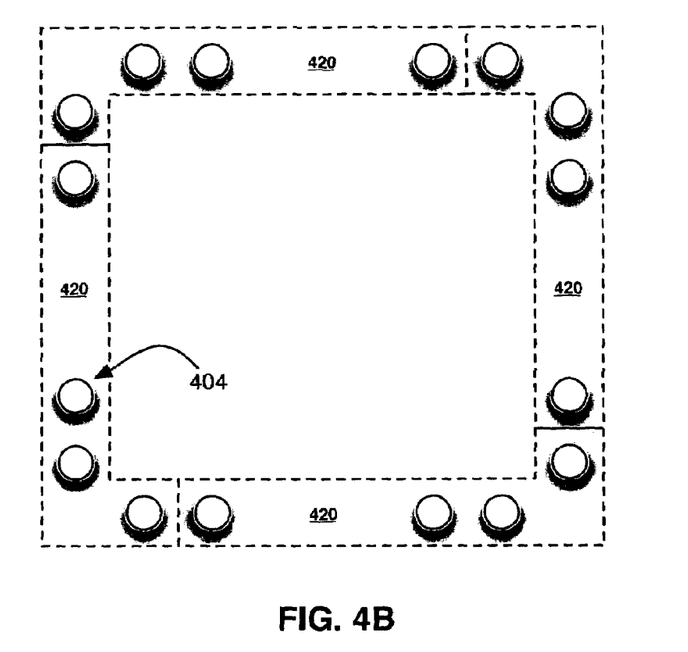

FIG. 4B shows an alternative way to divide an antenna array 104 containing 16 antenna elements 404 into four subgroups 420. In this example, each subgroup largely corresponds to a face; however, the subgroups are shifted so as to include an antenna from a different face. By including an antenna element from a different face, the antenna subgroup 420 may provide increased spatial diversity in some situations. For example, a remote station situated near a corner of antenna array 104 may not have sufficient spatial diversity with a single face (i.e., with antenna subgroup 410). However, an antenna subgroup spanning multiple faces (e.g., subgroup 420) may provide increased spatial diversity, resulting in increased overall performance.

Figure 4C:
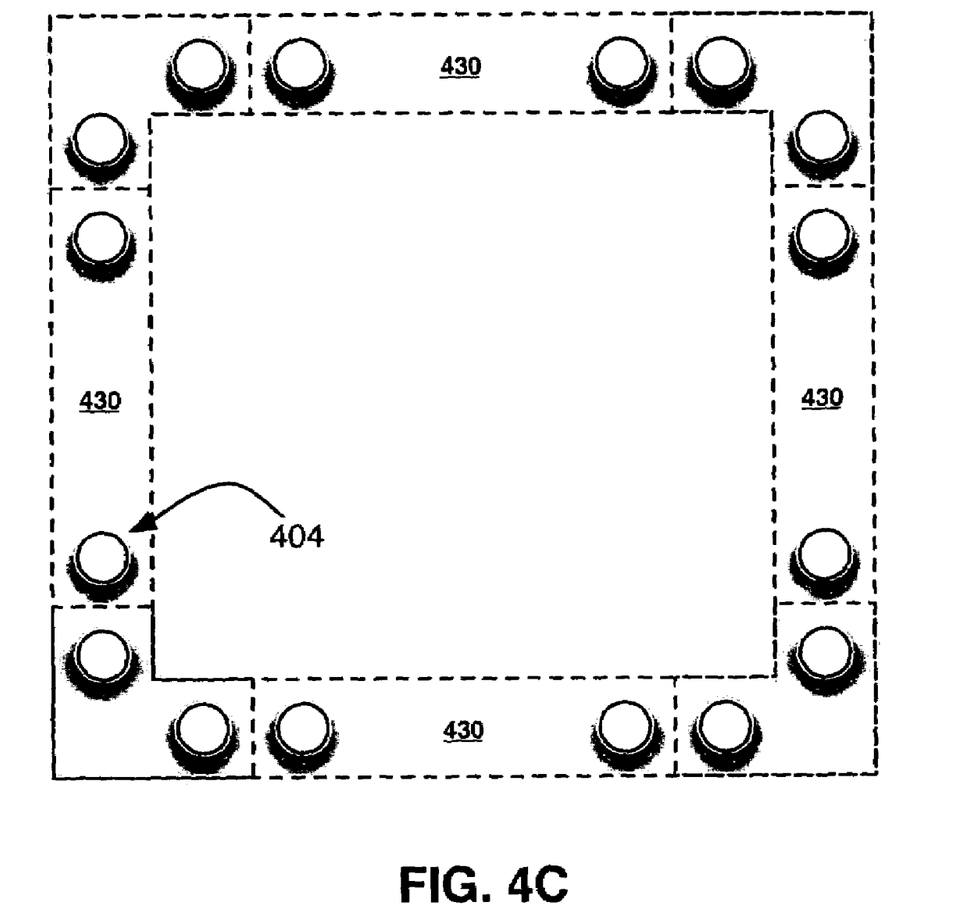

Referring to FIG. 4C, the antenna subgroup 420 (described above with reference to FIG. 4B) shifts subgroups so that they overlap face boundaries. An alternative way to achieve increased spatial diversity is to allow an antenna element 404 to fall within multiple subgroups. In the example show in FIG. 4C, each subgroup 430 includes six antenna elements 404 (i.e., all four elements from one face and one antenna element from each adjacent face. This technique may provide increased spatial diversity for each subgroup.

Allowing a single antenna element 404 to belong to multiple subgroups 430 introduces some complications. Two subgroups 430 may simultaneously receive and process signals using spatial processing; however, simultaneous transmission requires special consideration. Several approaches may be used to facilitate a shared transmission channel. For example, scheduling may be used to allow subgroups 430 to share a single antenna. Many conventional scheduling approaches may be used, such as, for example, two time periods (A and B) may be designated for transmission with subgroups 430 on opposite faces sharing the same time period. Thus, at time period A, two of the subgroups 430 on opposite faces may simultaneously transmit and at time period B, the remaining two subgroups 430 may transmit. This prevents a single antenna element from being used to transmit by multiple subgroups at one time.

In another approach, antenna elements 404 shared by two subgroups 430 may be coupled to the multiple subgroups using a radio frequency combiner. This allows two subgroups 430 to transmit using the same antenna element 404 at the same time; however, if both subgroups 430 are using the same frequencies at the same time, there is the potential for interference.

The antenna subgroups and techniques described above are provided for purposes of example. One skilled in the art will appreciate that the antenna subgroups may be arranged in any fashion. For example, antenna elements 404 may be randomly assigned to subgroups; an antenna array 104 having four faces may be divided into three subgroups; and an antenna subgroup may be noncontiguous. Many other variations should be apparent.

Using the antenna arrays 104 and subgroup configurations described above, a radio communication system 100 may be implemented using beamforming technology to simultaneously transmit to multiple devices using the same frequencies.

Figure 5A:
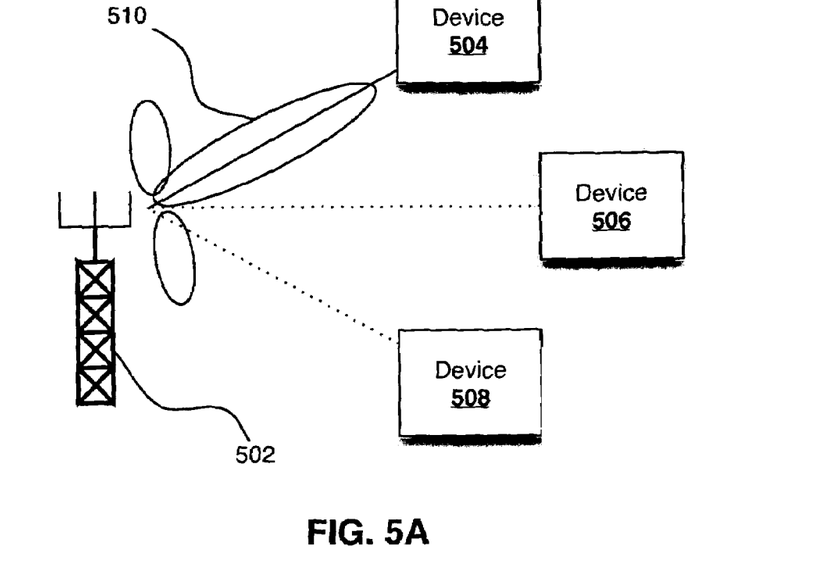
FIGS. 5A, 5B, and 5C are diagrams of desired antenna radiation patterns for singles transmitted to or received from each of three devices in a multi-device beamforming system.

FIGS. 5A-5D show the application of beamforming technology to one subgroup of antenna elements within an antenna array 104. In FIG. 5A, a multi-user system provides communication between a base station antenna 502 and various devices 504, 506, and 508. By using spatial processing techniques (e.g., beamforming), a set of complex weights may be calculated to steer maximum gain towards a particular device (in this case device 504). Conventional spatial processing techniques vary the radiation pattern of transmitted signals with maximum gain focused in one general direction; however, radiation patterns usually include one or more sidelobes whereby the signal is transmitted in a direction other than that of the intended target of communication. In this example, a set of complex weights is calculated to produce radiation pattern 510 with maximum gain focused towards device 504.

Figure 5B:
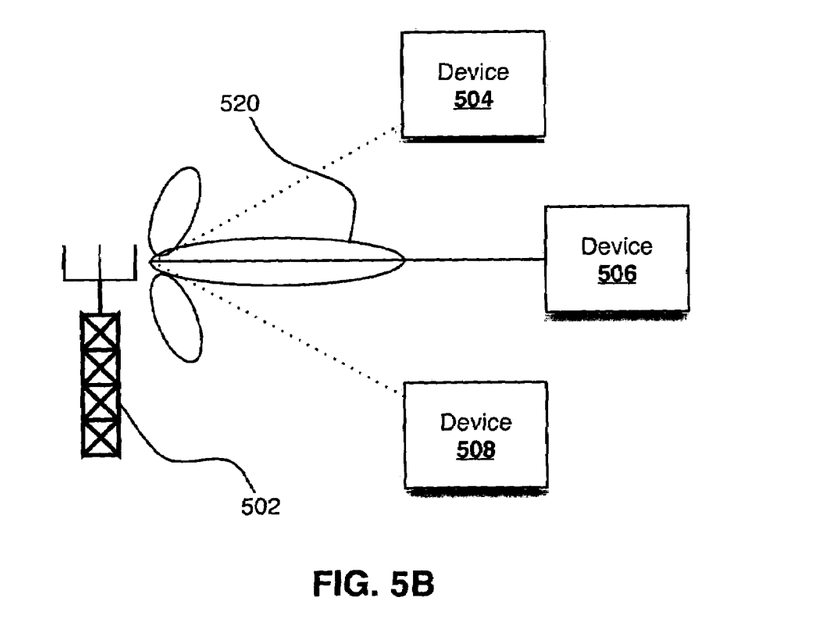
Figure 5C:
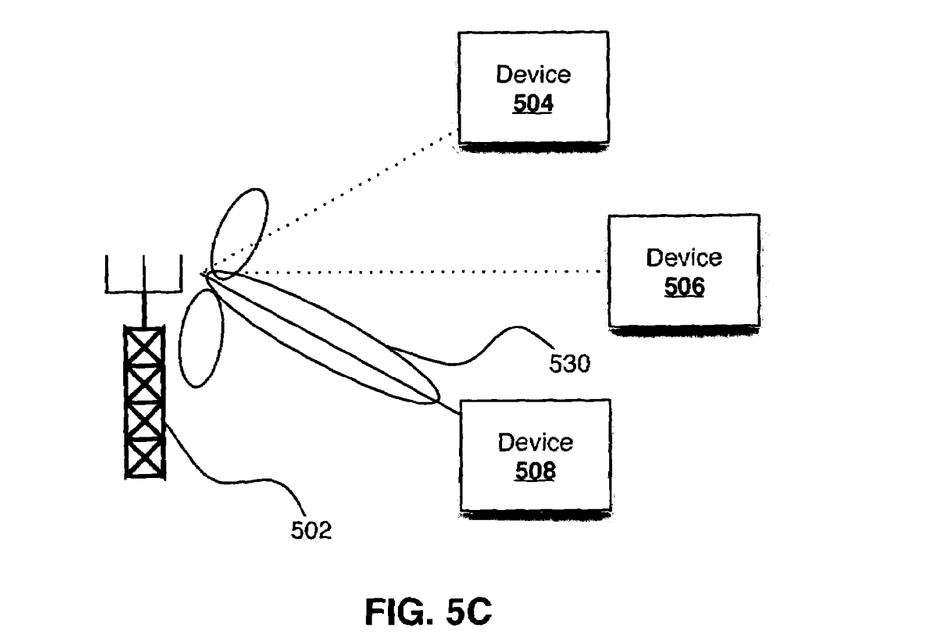

Referring to FIGS. 5B and 5C, complex weights also may be calculated to steer signals towards devices 506 and 508 by producing radiation patterns 520 and 530. In a radio communication system that communicates with a single device at a time, each of the radiation patterns 510, 520, and 530 may be separately applied when communicating with the corresponding intended device 504, 506, or 508. However, the radiation patterns also may be combined such that the radio communication may simultaneously communicate with multiple devices. For example, when transmitting to multiple devices simultaneously, a radio system can apply each of the three sets of complex weights generating radiation patterns 510, 520, and 530 to a different transmission signal. The resulting signals may be combined and transmitted to each intended device 504, 506, and 508. Because signals between the antenna 502 and each of the devices 504, 506, and 508 are processed using weights to generate radiation patterns 510, 520, and 530, communications between the antenna 502 and a single device should not interfere with communications with the other devices. Accordingly, it is even possible for each of the devices 504, 506, and 508 to simultaneously use the same frequencies without inter-device interference.

Figure 5D:
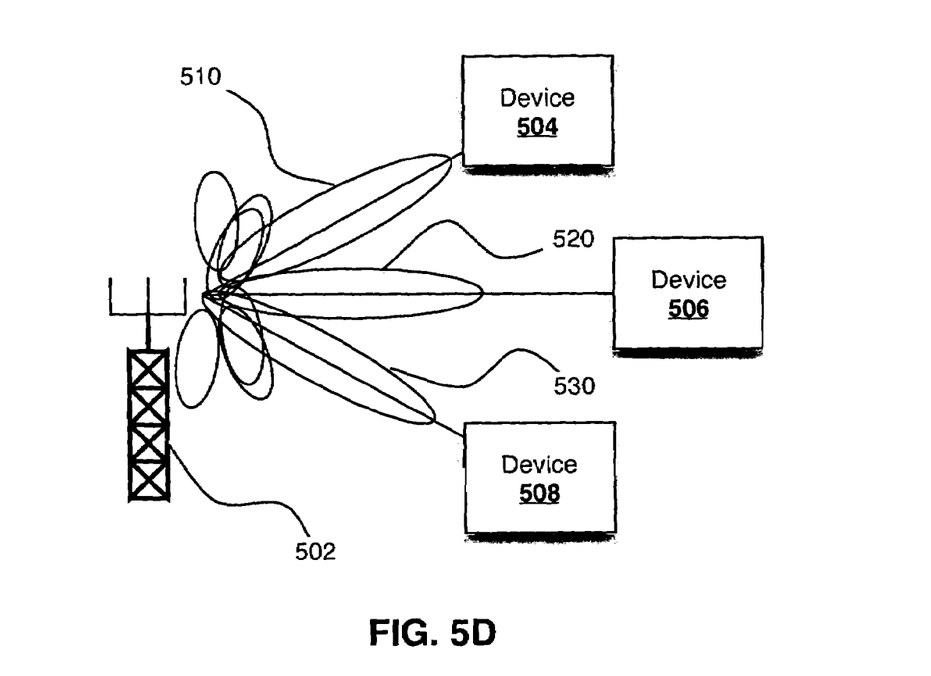
FIG. 5D shows the desired combination of the component signals of FIGS. 5A-5C to simultaneously communicate with multiple devices.

FIG. 5D shows the result of combining radiation patterns 510, 520, and 530. Each radiation pattern may be applied to the same signal or to different signals, such that information may be simultaneously communicated to multiple devices. In this example, an antenna 502 communicates with devices 504, 506, and 508 by applying complex weights to produce antenna radiation patterns 510, 520, and 530. When antenna 502 is simultaneously receiving information from devices 504, 506, and 508, a signal processor may successively apply the weights corresponding to the radiation patterns 510, 520, and 530 to isolate the desired communication signal.

For example, if antenna 502 is excited by signals from devices 504 and 508, then an attached radio can isolate the desired signal by applying the complex weights corresponding to the intended device. To receive a signal from device 504, signal processing techniques may be used on a signal received by antenna 502 to apply complex weights corresponding to radiation pattern 510. This effectively amplifies signals received from the direction of device 504 and filters out signals received from other directions. Similarly, signal processing can be used to isolate communications from other devices.

A multi-user radio system using spatial processing, such as, for example, beamforming, can transmit communication signals to various devices 504, 506, and/or 508 by determining one or more communication signals to transmit, applying appropriate signal processing to each communication signal, combining the processed signals together, and transmitting the combined signal. For example, a radio using beamforming to transmit a first communication signal to device 504 and a second communication signal to device 506 can apply complex weights corresponding to radiation pattern 510 to the first communication signal and complex weights corresponding to radiation pattern 520 to the second communication signal. The resulting two communication signals may be combined and transmitted using antenna 502. Because the complex weights vary radiation patterns, the first signal should be primarily transmitted in the direction of device 504 and the second signal should be primarily transmitted in the direction of device 506.

If both communication signals use the same frequency, they could potentially interfere with one another; however, so long as the spatial processing sufficiently isolates the two signals, such communication is possible. Often a system using spatial processing will calculate certain parameters (such as the complex weights in beamforming) based on received signals. These parameters then may be used to control transmitted signals. Because transmit and receive paths may differ, variations in phase and amplitude are possible.

Figure 6:
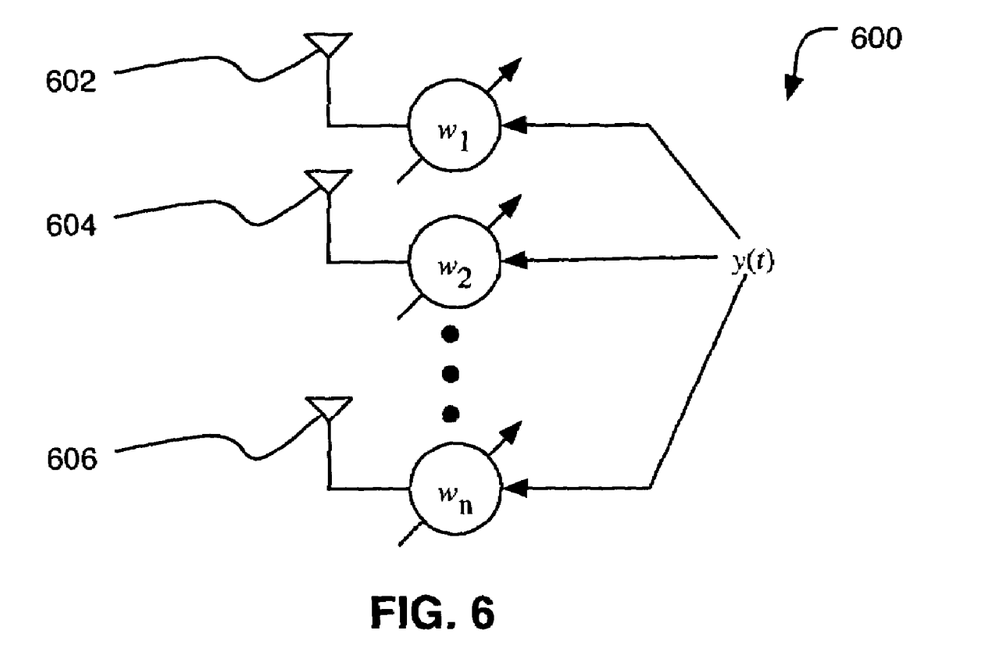
FIG. 6 is a block diagram of a radio communication system using spatial processing techniques.

Referring to FIG. 6, a typical radio communication system 600 using spatial processing techniques applies a set of complex weights (i.e., $w_1, w_2, \ldots w_n$) to an output signal y(t) to provide increased spectral efficiency. In some implementations, radio communication system 600 performs transmit beamforming by calculating a set of complex weights ($w_1, w_2, \ldots w_n$) with each weight corresponding to an antenna (602, 604, or 606). The antennas (602, 604, and 606) operate together as an antenna array that may include any number of antennas. The complex weights ($w_1, w_2, \ldots w_n$) are applied to an output signal y(t) and the resulting signals are transmitted by the antennas 602, 604, and 606. Because the complex weights ($w_1, w_2, \ldots w_n$) are calculated based on received signals, the transmission path may introduce some unwanted variations in phase and/or gain.

Figure 7A:
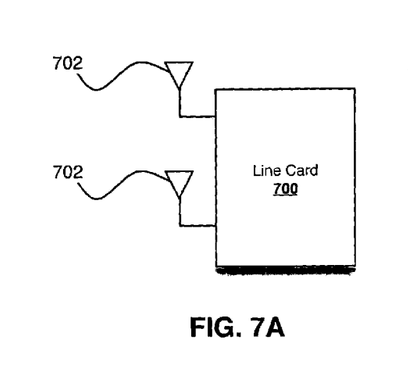
FIG. 7A is a block diagram of a line card coupled to two antennas for use in a radio communication system.

Referring to FIG. 7A, a line card 700 may be used for each antenna subgroup in a radio communication system 100. The line card 700 is coupled to each antenna element 702 within the subgroup. In a conventional beamforming system, a single monolithic signal processor typically is coupled to each antenna in an array to perform spatial processing. As discussed above, an antenna array 104 may be subdivided such that spatial processing is performed separately for each subgroup of antenna elements. Accordingly, a line cards 700 may be assigned to antenna subgroups to reduce the overall computational complexity and reduce the required hardware. In addition, line cards 700 may be incrementally added to a base station 102 to provide a scalable architecture that grow with a wireless provider's business.

Figure 7B:
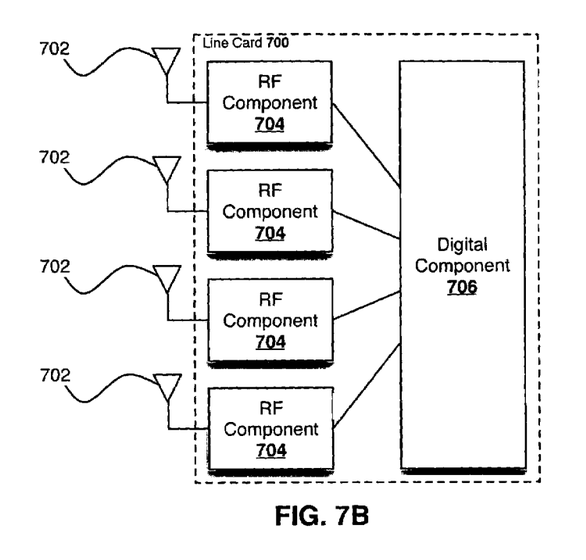
FIG. 7B is a detailed block diagram of a line card.

Referring to FIG. 7B, a line card 700 is coupled to multiple antennas 702 and includes an RF component 704 associated with each antenna, and at least one digital component 706. Though a line card 700 may employ as few as two antennas 702, a typical implementation will usually employ a greater number, such as, for example four antennas. By using multiple antennas, the digital component 706 can implement spatial processing techniques, varying the signals sent to or received from each of the RF components 704 to improve performance. In an implementation of a broadband wireless radio implementing transmit beamforming, a line card 700 is coupled to 4 antennas 702 with each of the antennas 702 associated with an RF component 704, such as the RF component 704 described below with respect to FIG. 8. The RF components 704 are coupled to the digital component 706 which may be implemented using an application-specific integrated circuit (ASIC) or a digital signal processor (DSP) or other processing device.

In this implementation, the RF components 704 provide two modes: transmit and receive. In transmit mode, a signal to be transmitted is received from the digital component 706, up converted to a transmit frequency or frequencies, amplified, and then transmitted. Various filtering also may be implemented to improve the quality of the transmitted signal. For example, the signal received from the digital component 706 is typically modulated at a baseband frequency. This signal may be passed through a low-pass filter to prevent amplication of any extraneous artifacts. Once the signal has been up converted and amplified, it may be passed through a band-pass filter to prevent any out-of-band transmissions.

Similarly, the RF component 704 may be placed in a receive mode such that signals received by antenna 702 are passed through a low-noise amplifier, then down converted to baseband frequency, and then passed to the digital component 706 for processing. Various filtering may be added to improve performance, such as, for example, a band-pass filter may be applied to signals received through antenna 702 to prevent the processing of out-of-band signals, and a low-pass filter may be used on the down converted signal. In some implementations, the RF component may include components to convert signals between digital and analog representations; however, in this implementation, the signal conversion takes place in the digital component 706.

Figure 8:
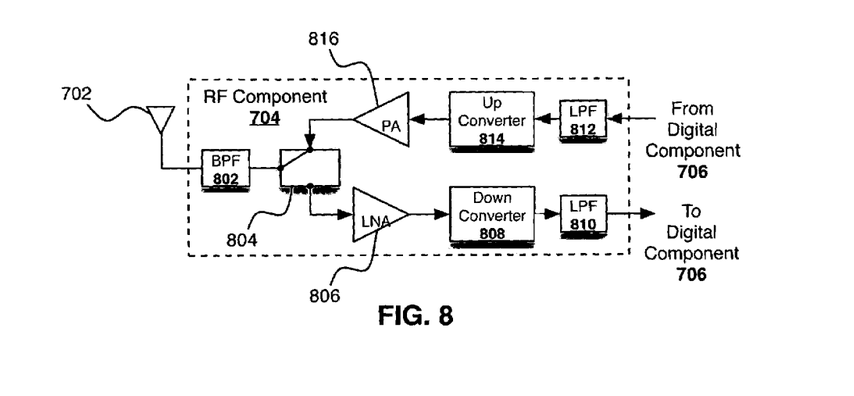
FIG. 8 is a block diagram of a radio frequency component for use in a line card such as that shown in FIG. 7B.

Referring to FIG. 8, an exemplary implementation of RF component 704 includes a band pass filter (BPF) 802 coupled to the antenna 702 and used on both that transmit and receive paths to filter out signals outside the frequency or frequencies of interest. The BPF 802 is coupled to a switch 804 that selectively enables the receive path or the transmit path to use the antenna 802. The switch 804 is coupled to the receive path where signals pass through a low noise amplifier (LNA) 806, then a down converter 808, and, finally, a low pass filter (LPF) 810, before being passed to the digital component 706. When transmitting, signals are received from the digital component 706, passed through a low pass filter (LPF) 812, converted to transmission frequency or frequencies by up converter 814, and passed through a power amplifier (PA) 816. The transmit path is coupled to antenna 702 using switch 804 such that the amplified signal is passed through BPF 802 and then transmitted using antenna 702.

Figure 9:
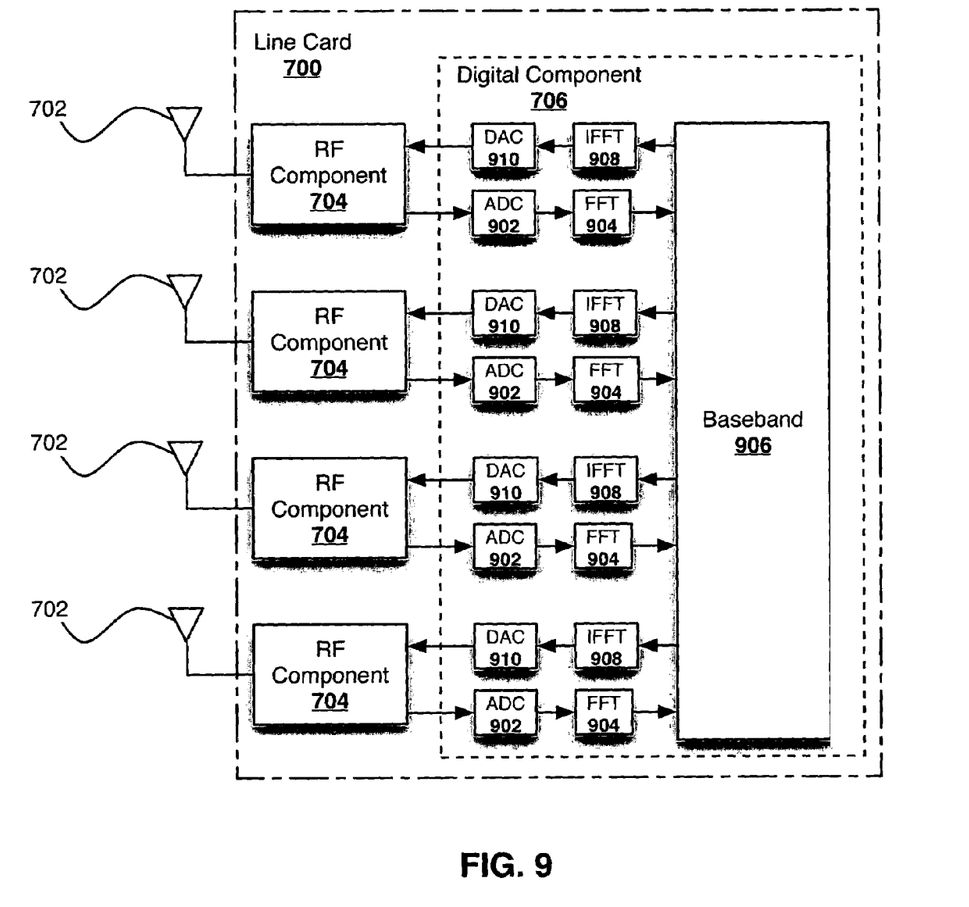
FIG. 9 is a block diagram of a line card including details of the digital component.

Referring to FIG. 9, an exemplary implementation of the digital component 706 of FIG. 8 receives signals from multiple RF components 704. To process the received signals, the digital component includes one or more analog-to-digital converters (ADC) 902. In this implementation, orthogonal frequency division multiplexing (OFDM) to provide increased bandwidth utilization while supporting multiple users. To process OFDM signals, this implementation of digital component 706 includes a fast Fourier transform (FFT) component 904. The transformed digital signal is then passed to baseband 906 for processing. Baseband 906 is typically implemented using a digital signal processor. To transmit signals, the baseband 906 sends signals through an inverse fast Fourier transform 908 and a digital to analog converter (DAC) 910. The converted signals are then passed through RF component 704 to be transmitted using antenna 702.

Figure 10A:
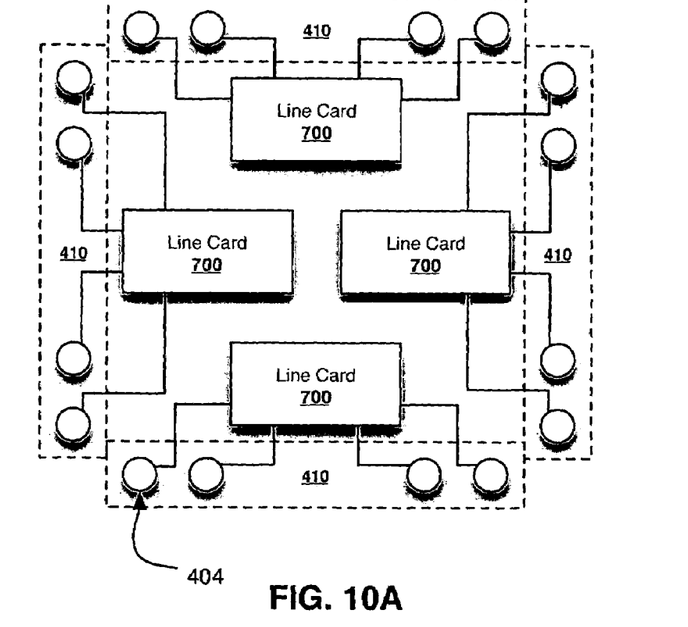
FIGS. 10A and 10B are block diagrams of radio communication systems showing connections between line cards and antenna elements.
Figure 10B:
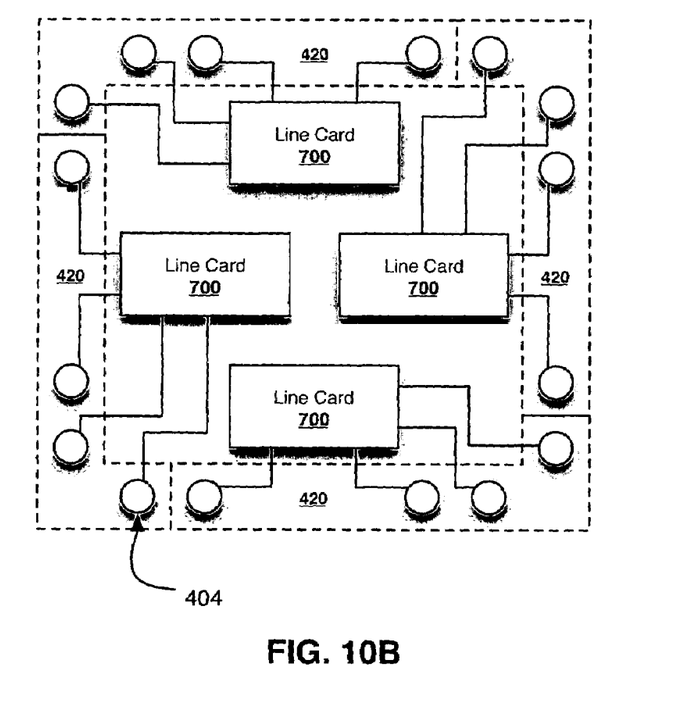

FIGS. 10A and 10B show exemplary line cards 700 configurations in a base station 102. In FIG. 10A, line cards 700 are coupled to the antenna subgroups 410 shown in FIG. 4A. The line cards 700 may be added incrementally as capacity requirements grow. For example, a wireless service provider may deploy a base station 102 including a single line card 700 coupled to antenna subgroup 410. As capacity grows, the wireless service provider may add line cards 700 to meet growing capacity with only the incremental expense of adding a line card 700. Similarly, in FIG. 10B, line cards 700 are coupled to the antenna subgroups 420 shown in FIG. 4B. These examples show line cards 700 coupled to separate antenna subgroups; however, line cards 700 also may be added to the same or overlapping antenna subgroups.

Figure 11A:
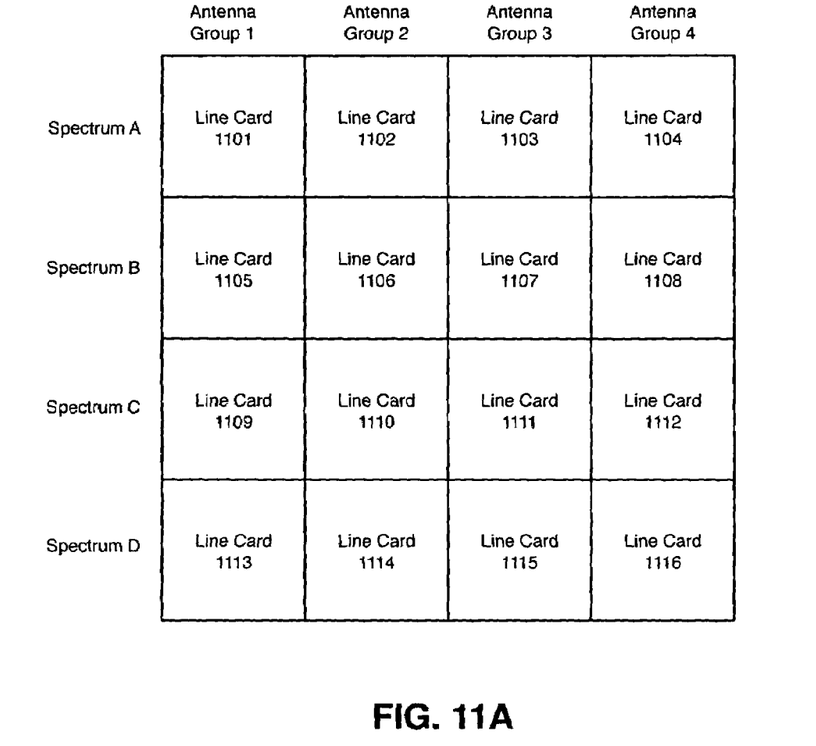
FIG. 11A is a table showing line card allocations to spectrum and antenna subgroups in an exemplary radio communication system.

Referring to FIG. 11A, the available spectrum for a base station 102 may be divided into subgroups (such as, for example, spectrum A, B, C, and D) and the available antenna elements may be divided into subgroups (such as, for example, subgroups 1, 2, 3 and 4). Each combination of spectrum and antenna subgroups may be assigned to a particular line card. In this manner, a base station 102 may be fully populated using 16 line cards 700. For example, a wireless metropolitan area network may use a total of 20 megahertz spectrum divided into 5 megahertz blocks, and 16 antenna elements divided into four subgroups (such as, for example, in the manner shown in FIGS. 4A-4C). Then, line cards 700 may be assigned to a 5 megahertz block and a group of four antenna elements. In this example, line card 1101 is associated to Spectrum A/Antenna Group 1 (designated "A/1"). Line card 1102 is assigned to A/2, line card 1103 is assigned to A/3, and line card 1104 is assigned to A/4. Since each of these line cards (1101, 1102, 1103, and 1104) are configured to use the same spectrum across different antennas, they may operate independently; however, there may be some occasional interference between line cards.

Figure 11B:
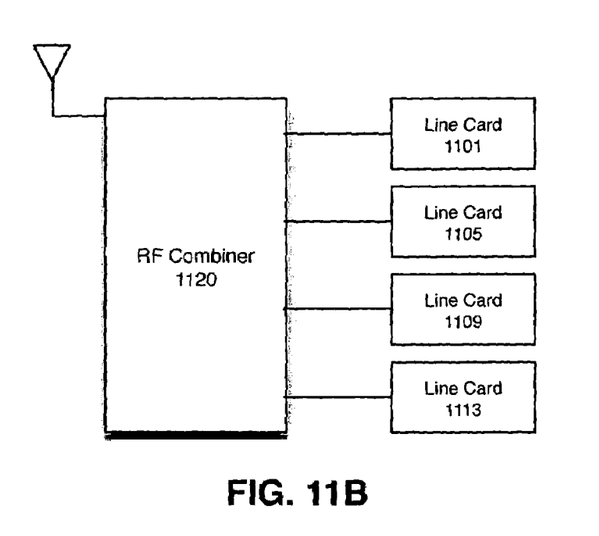
FIG. 11B is a block diagram of a base station including a radio frequency combiner.

Referring to FIG. 11B, the table shown in FIG. 11A shows line cards 1101, 1105, 1109, and 1113 assigned to different portions of the spectrum using antenna group 1. Since each is using the same antenna, a radio frequency combiner 1120 may be used to combine the signals from each line card 1101, 1105, 1109, and 1113 so that they may simultaneously transmit using the same antenna element.

Figure 11C:
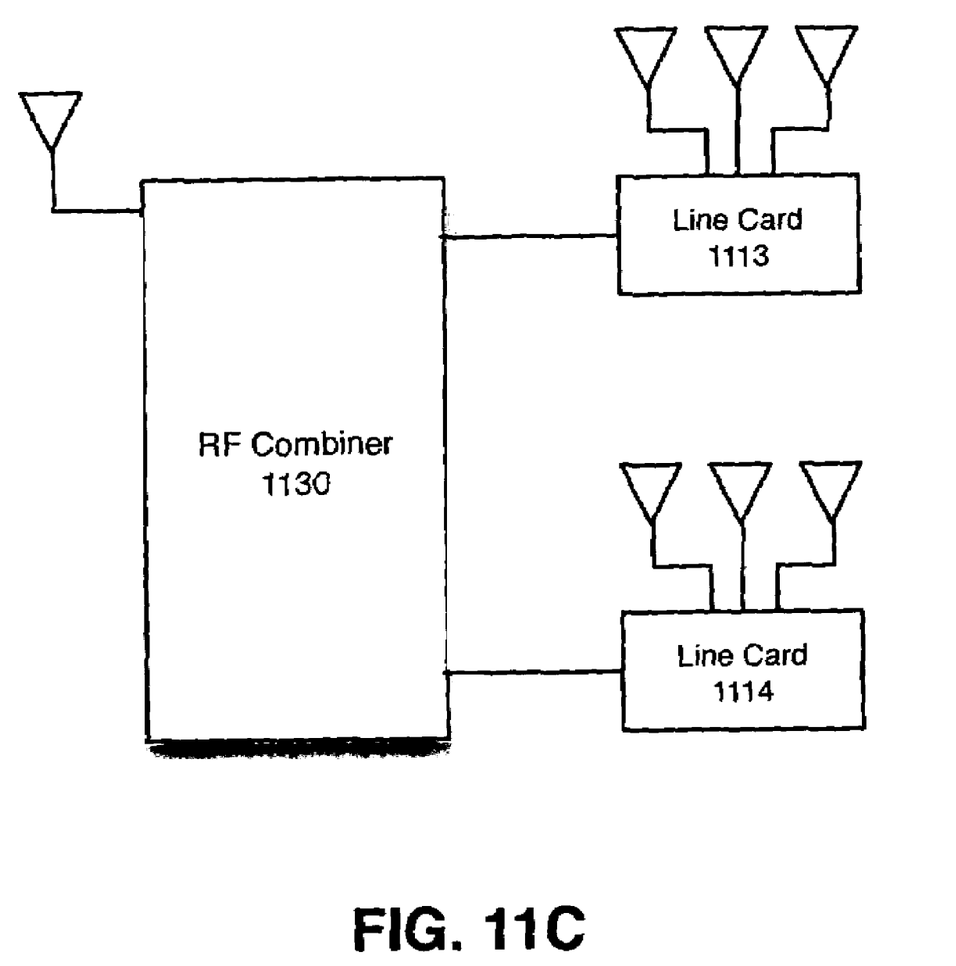
FIG. 11C is a block diagram of a base station including a radio frequency combiner for an antenna assigned to multiple subgroups.

Referring to FIG. 11C, a radio frequency combiner 1130 also may be used to combine radio frequency signals for an antenna assigned to multiple subgroups. The example described above with respect to FIGS. 11A and 11B shows how a radio communication system may be implemented to provide incremental increases in the overall system capacity. As more capacity is required, additional line cards may be added. The radio frequency combiner 1120 combines signals from two or more line cards so that they may use the same antenna element for transmission. FIG. 11A shows how a single antenna group may be assigned to multiple line card. However, two antenna groups may include some overlap.

If a single antenna element is assigned to multiple subgroups (e.g., overlapping subgroups shown in FIG. 4C), then a radio frequency combiner 1130 may be used to combine signals from two line cards. FIG. 11C shows a radio frequency combiner 1130 coupled to two line cards 1113 and 1114. In this example, the line cards 1113 and 1114 are each coupled to four antennas with a single antenna element overlapping the two. In some implementations, scheduling or other techniques are used such that radio frequency combining is unnecessary. By subdividing spectrum and/or antenna arrays, the computational and hardware requirements for spatial processing may be reduced in a manner that facilitates a scalable deployment. A number of implementations have been described. Nevertheless, it will be understood that various modifications may be made without departing from the spirit and scope of the invention. Accordingly, other implementations are within the scope of the following claims.

What is claimed is:

1. A radio communication system comprising:
   multiple antenna elements divided into subgroups, each subgroup including at least two of the multiple antenna elements; and
   multiple line cards operable to employ spatial processing techniques, each line card coupled to a subgroup such that the line card may transmit and receive signals using the subgroup,
   wherein one of the multiple antenna elements belongs to at least two subgroups, and
   wherein each of the multiple line cards includes:
      multiple radio frequency components such that each radio frequency component is coupled to an antenna element of the subgroup; and
      a signal processing component coupled to the multiple radio frequency components, the signal processing component operable to employ spatial processing techniques.

2. The radio communication system of claim 1 wherein the subgroups are non-overlapping.

3. The radio communication system of claim 1 further comprising a radio frequency combiner such that at least two line cards may be coupled to an antenna element of the multiple antenna elements using the radio frequency combiner, the radio frequency combiner combining signals such that the at least two line cards may simultaneously transmit signals through the antenna element.

4. The radio communication system of claim 1 wherein the multiple antenna elements are disposed about multiple faces.

5. A radio communication system comprising:
   multiple antenna elements divided into subgroups, each subgroup including at least two of the multiple antenna elements; and
   multiple line cards operable to employ spatial processing techniques, each line card coupled to a subgroup such that the line card may transmit and receive signals using the subgroup;

wherein the multiple antenna elements are disposed about multiple faces, wherein at least one subgroup includes an antenna element that is not situated on the corresponding face of the subgroup, and wherein each subgroup corresponds to one of the multiple faces.

6. A base station for use in a radio communication system, the base station comprising:

a line card comprising:

an antenna interface used to couple the line card to a subgroup of multiple antenna elements;

a radio frequency component coupled to the antenna interface;

a signal processing component coupled to the radio frequency component such that the line card is operable to transmit and receive radio frequency communications; and a radio frequency combiner coupled to a subgroup of the multiple antenna elements such that the line card is coupled to the subgroup of the multiple antenna elements through the radio frequency combiner, wherein the base station is operable to receive an additional line card so as to increase the capacity of the base station.

7. The base station of claim 6 wherein the additional line card is coupled to a different subgroup of the multiple antenna elements to increase capacity of the base station.

8. The base station of claim 6 further comprising a second line card such that the line card and the second line card are coupled to the subgroup of the multiple antenna elements using the radio frequency combiner.

9. The base station of claim 6 wherein the additional line card is coupled to the same subgroup of the multiple antenna elements to increase capacity of the base station by supporting additional spectrum.

10. The base station of claim 9 wherein each line card supports 5 megahertz of spectrum.

11. A method for providing increased capacity in a radio communication system, the method comprising:

dividing an antenna array, creating N subgroups of antenna elements;

for each of the N subgroups of antenna elements, coupling a line card to the subgroup of antenna elements; and dividing available spectrum, creating M subgroups of the available spectrum such that each line card is operable to service a subgroup of the available spectrum;

wherein capacity of the radio communication system is increased by configuring multiple line cards to service different subgroups of the available spectrum using the same subgroup of antenna elements, and wherein each line card is operable to communicate using its coupled subgroup of antenna elements.

12. The method of claim 11 wherein the antenna array includes at least one antenna element that is not within the N subgroups of antenna elements.

13. The method of claim 11 wherein each subgroup of antenna elements includes 4 antennas.

14. The method of claim 11 wherein the antenna array includes four faces and each of the subgroups of antenna elements corresponds to one of the four faces.

15. The method of claim 11 wherein at least one antenna element is included in more than one of the N subgroups of antenna elements.

* * * * *